J. O. CARLSON.
ADJUSTABLE CONCAVE FOR GRAIN THRESHING MACHINES.
APPLICATION FILED MAR. 22, 1907.

902,710.

Patented Nov. 3, 1908.

J. O. CARLSON.
ADJUSTABLE CONCAVE FOR GRAIN THRESHING MACHINES.
APPLICATION FILED MAR. 22, 1907.
902,710.
Patented Nov. 3, 1908.
3 SHEETS—SHEET 2.
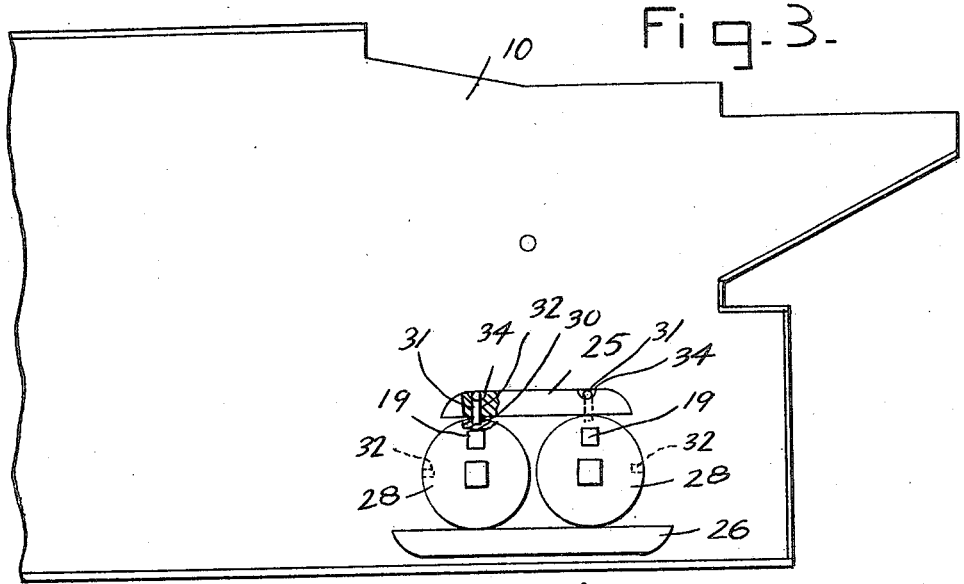
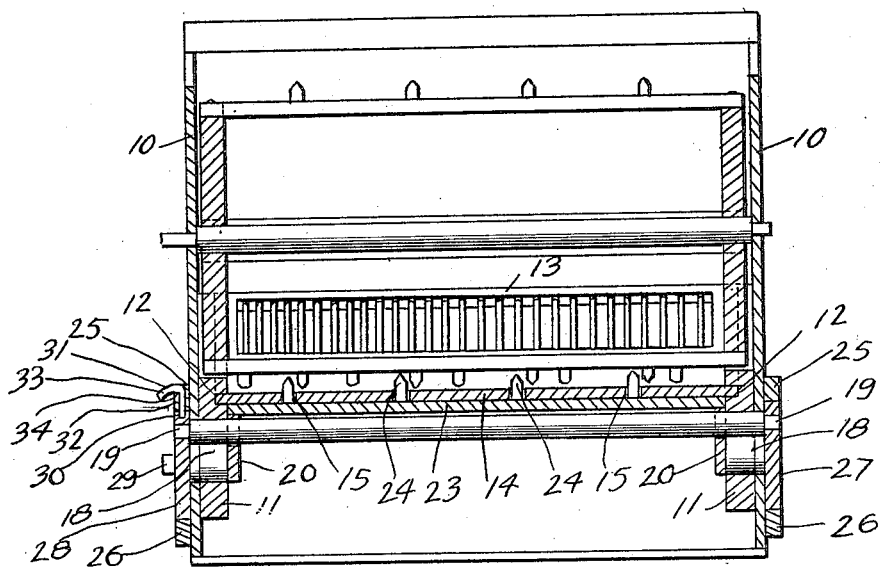

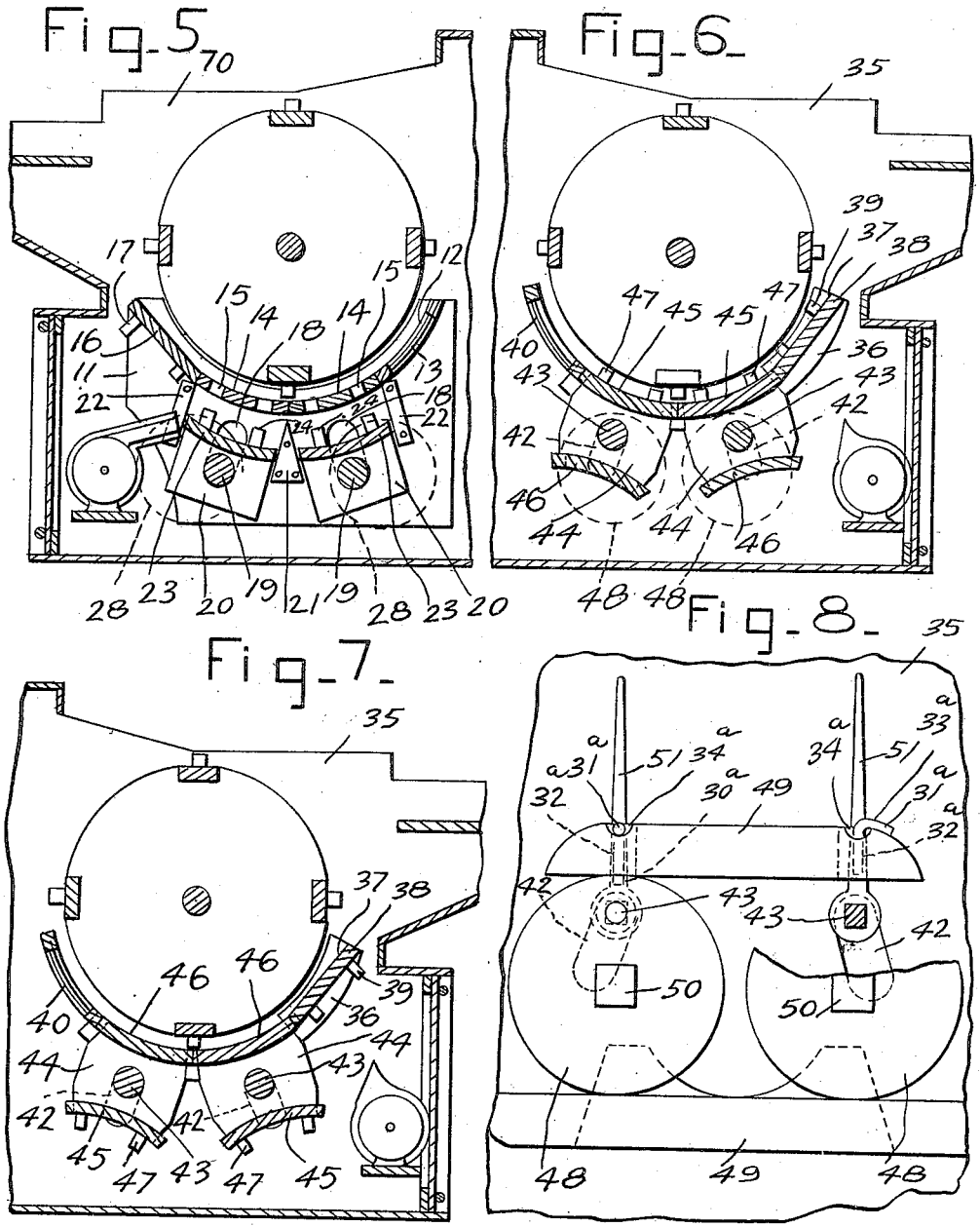

UNITED STATES PATENT OFFICE.

JOHN O. CARLSON, OF FUNK, NEBRASKA.

ADJUSTABLE CONCAVE FOR GRAIN-THRESHING MACHINES.

No. 902,710.    Specification of Letters Patent.    Patented Nov. 3, 1908.

Application filed March 22, 1907. Serial No. 363,904.

*To all whom it may concern:*

Be it known that I, JOHN O. CARLSON, a citizen of the United States, residing at Funk, in the county of Phelps, State of Nebraska, have invented certain new and useful Improvements in Adjustable Concaves for Grain-Threshing Machines; and I do hereby declare the following to be a full, clear, and exact description of the invention, such as will enable others skilled in the art to which it appertains to make and use the same.

This invention relates to concaves for threshing machines and more particularly to adjustable concaves, or in other words one in which a blank or toothed working surface may be presented at the will of the operator of the machine, the adjustment being had while the machine is in motion.

With the concaves now in use it is necessary, in order to change the working face of the concave, to stop the entire machine and in most cases to remove the concave. By the employment of the concave embodying my invention however, the character of the working face of the concave may be instantly changed by the change in position of an eccentric.

One of the novel features of my invention resides in the provision of a novel means for holding the parts of the device in either of their adjusted positions.

Figure 1:
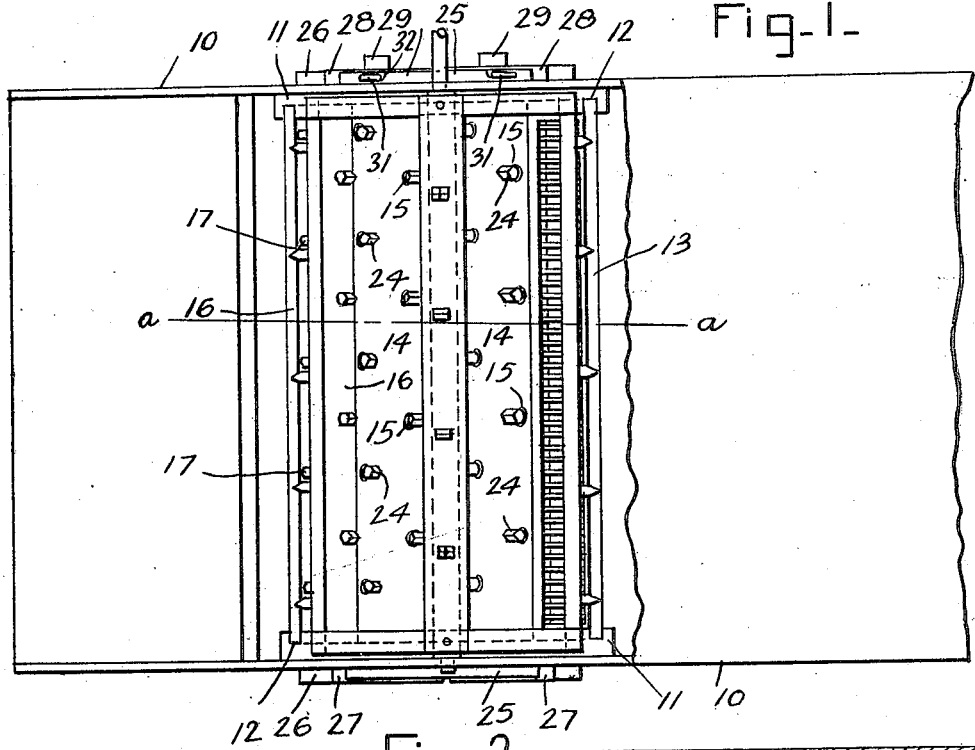
Figure 2:
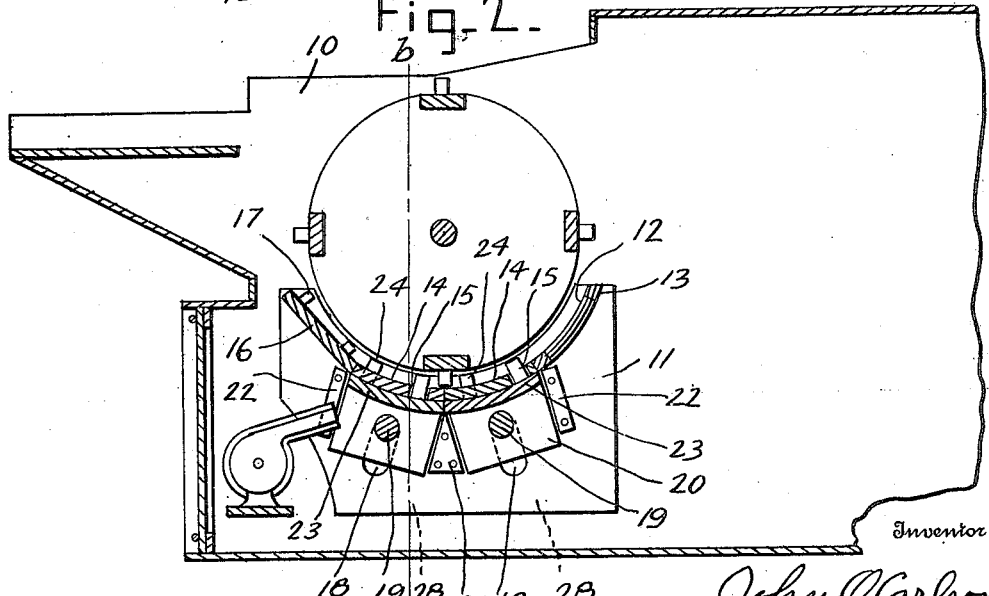

In the accompanying drawings, Figure 1 is a top plan view of a threshing machine concave the same being adjusted to present a toothed working face, Fig. 2 is a vertical longitudinal sectional view through the same, on the line *a—a* of Fig. 1. Fig. 3 is a side elevation of the machine. Fig. 4 is a vertical transverse sectional view, on line *b—b* of Fig. 2. Fig. 5 is a view similar to Fig. 2 showing the toothed plates lowered so as to present a plane working face, Fig. 6 is a view similar to Fig. 2 showing a slightly modified form of my invention the toothed face of the concave being presented, Fig. 7 is a similar view but showing the plane face presented, and, Fig. 8 is a detail view in elevation of a slightly modified form of eccentric disk.

Referring more specifically to the drawings the sides of the threshing machine are indicated by the numeral 10. Secured upon the inner face of each side 10 is a plate 11 and this plate is provided at its upper edge with an arcuate groove 12. In the grooves in the plates are received the ends of the usual grate 13 and removably received at their ends in the grooves are the sections 14 of the concave which sections are in the form of plates provided with openings 15 the purpose of which openings will be presently explained. These sections of the concave are located between the grate 13 and an end section which is indicated by the numeral 16 and differs from the sections 14 inasmuch as it is provided upon its working face with a plurality of teeth 17. This end section 16 is however received at its ends in the grooves 12 in the plates 11 and together with the sections 14 and the grate 13, completes the concave or rather the working face thereof.

The plates 11 are slotted as at 18 as are also the sides 10 of the machine and extending through these slots are shafts 19 at the ends of which are arranged heads 20, it being understood that these heads are loose from the shafts. The slots 18 in each plate are inclined upwardly in converging planes and bolted upon each plate and between the slots is a guide block 21, there being other guide blocks 22 arranged to the opposite sides of the slots 18 and bolted to the plate. The guide block 21 is triangular in shape and between each of its side edges and the opposing edge of the adjacent block 22 is positioned one of the heads 20 it being understood that the heads will be in this manner guided during any vertical movement that they may have. Connecting the corresponding heads at opposite sides of the machine are plates 23 which plates are provided upon their upper faces with upwardly projecting teeth 24 which are arranged in the same manner as are the openings 15 in the respective concaved sections 14 and are adapted to enter at times through the said openings. Arranged from the outer face of each side 10 of the machine are cleats 25 and 26, the cleats 25 being located above the cleats 26 and in parallel relation with respect thereto. Secured upon the ends of the shafts 19 and outwardly of the sides 10 of the machine are eccentrics 27 and 28, the eccentrics 27 being located at one side of the machine and the other eccentrics at the other sides thereof, and these eccentrics are received between the respective cleats 25 and 26 and are in engagement at their peripheries with the same at all times. Formed integral with each of the eccentrics 28 and centrally thereof is a squared projection 29 which may be engaged by a wrench so that the eccentrics and the shafts upon which they are mounted may be turned it being understood of course that this turning movement, owing to the positioning of the eccentrics between the cleats, will result in a vertical movement of the shafts 19 in the slots 18 so as to cause the teeth 24 to project through the openings in the concaved sections or to move the teeth out of such engagement and present a plane working face in the concave with the exception of the end section 16 thereof.

Now in order that the eccentrics may be held in adjusted positions, each of the eccentrics 28 is provided at its periphery with a plurality of openings 30 in which are designed to project pins 31 which are seated in suitable bores 32 formed in the upper one of the corresponding cleats 25, there being springs arranged within these bores and connected with the pins to hold the same in such engagement. These springs however may be turned and the upper ends of the pin are bent substantially at right angles as at 33 and the ends of the cleats are cut away as at 34 so that when the pins are turned with their upper ends projecting away from the side of the machine, the pins will seat in the openings 30 but when the pins are raised against the tension of their springs and are turned so that their upper ends lie against the said side of the machine, the pins are held out of such engagement.

From the foregoing description of my invention it will be observed that the character of the working face of the concave may be changed in a few moments' time merely by the turning of the shafts upon which the eccentrics are mounted.

In the modified form of my invention shown in Figs. 6 and 7, the sides of the machine are indicated by the numeral 35 and arranged upon the inner faces of the side are blocks 36 which have grooves 37 formed therein for the reception of the ends of a concaved section 38 having a plurality of teeth 39, this section of the modified form of concave being the one which corresponds to the section 16 of the preferred form. I employ the same form of grate in this form of the concave however and this grate is indicated by the numeral 40. In this form of my invention the other sections of the concave include a plane and a toothed working face as will be presently specifically described.

The sides of the machine are slotted as at 42 and extending through these slots are the ends of shafts 43 upon which shafts are secured end and intermediate heads 44 which are rectangular in shape and connecting which are plates 45 and 46, the plates 45 being provided upon their outer faces each with a plurality of teeth 47 whereas the plates 46 are plain. Eccentrics 48 are secured upon the shafts at the ends thereof and are arranged between cleats 49 and these eccentrics at one side of the machine are provided with squared extensions 50 which correspond to the extensions 29 upon the eccentrics 28 and are for the same purpose.

The cleats 49 at this side of the machine are spaced from the said side and secured upon the shafts 43 are levers 51 which, when the concaved sections have been lowered as far as possible, may be rocked to turn the sections or in other words to reverse them to present a different working face. For example if it is desired to change the character of the working face of the concave from a toothed face to a plane one, the shafts are first shifted through the instrumentality of the eccentrics and the levers are then grasped and rocked to bring the plane face or plate 46 into such position that further movement of the shaft will raise the section into proper position. The same means is employed in this form of my invention for holding the concaved sections in their various adjusted positions as is employed in the preferred form and the several parts of this means are indicated by the corresponding numerals but with the addition of the exponent "a."

In the form of the eccentric shown in Fig. 8 the eccentric is shown as being provided with a pair of openings 55 in which the legs of a span wrench may be engaged to turn the eccentrics.

What is claimed is—

1. A concave for threshing machines comprising, in combination with a frame having slotted side walls, shafts arranged within the frame and extending at their ends through the slots in the side walls thereof, guides fixed upon the said walls of the frame above and below the slots, eccentrics fixed to the ends of the shafts and located between said guides, a concave section carried by each of said shafts and adapted to be moved by the rotation thereof into and out of working position, and means carried by the guides and engageable with the eccentrics for holding the eccentrics at either limit of their turning movement.

2. A concave for threshing machines comprising, in combination with a frame having slotted side walls, shafts arranged within the frame and extending at their ends through the slots in the side walls thereof, guides fixed upon the said walls of the frame above and below the slots, eccentrics fixed to the ends of the shafts and located between said guides said eccentrics being provided with peripheral openings, a concave section carried by each of said shafts and adapted to be moved by the rotation thereof into and out of working position, and pins engaged through one of the guides and engageable interchangeably in the openings in the eccentrics for holding the eccentrics at either limit of their turning movement.

3. A concave for threshing machines comprising, in combination with a frame having slotted side walls, shafts arranged within the frame and extending at their ends through the slots in the side walls thereof, guides fixed upon the said walls of the frame above and below the slots, eccentrics fixed to the ends of the shafts and located between said guides said eccentrics being provided with peripheral openings, a concave working section carried by each of said shafts and adapted to be moved by the rotation thereof into and out of working position, and pins engaged through one of the guides and engageable interchangeably in the openings in the eccentrics for holding the eccentrics at either limit of their turning movement, said pins having their upper ends turned at right angles and engageable, when inserted in the eccentrics, in notches formed in the said guide, turning of the pins to move their right angularly bent ends out of the notches serving to disengage them from the eccentrics.

4. A concave for threshing machines comprising, in combination with a frame having slotted side walls, shafts arranged within the frame and extending at their ends in the slots in the side walls thereof, guides fixed upon the side walls of the frame above and below the slots, eccentrics fixed to the ends of the shafts and working between said guides, a reversible concave section carried by each of the shafts, and means upon the shafts for rotating the shafts at the lower limits of their movements in the slots so as to reverse the reversible concave working section.

5. A concave for threshing machines comprising, in combination with a frame having slotted side walls; shafts arranged within the frame and extending at their ends through the slots in the side walls thereof, guides fixed upon the said walls of the frame above and below the said slots, eccentrics fixed to the ends of the shafts and located between said guides, and a concave section carried by each of the shafts and adapted to be moved thereby into and out of working position.

6. A concave for threshing machines comprising, in combination with a frame having slotted side walls, shafts arranged within the frame and extending at their ends in the slots in the side walls thereof, guides fixed upon the side walls of the frame above and below the slots, eccentrics fixed to the ends of the shafts and working between said guides, and arms upon the shafts and coöperating with one of the guides for rotating the shafts at the time of their up and down movement in the slots so as to reverse the reversible concave working section.

In testimony whereof, I affix my signature, in presence of two witnesses.

JOHN O. CARLSON.

Witnesses:
  A. Franzen,
  Lorenzo Franzen.